United States Patent
Haddad et al.

(10) Patent No.: US 8,503,416 B2
(45) Date of Patent: Aug. 6, 2013

(54) METHOD AND SYSTEM FOR EFFICIENT HOMELESS MPLS MICRO-MOBILITY

(75) Inventors: Wassim Haddad, San Jose, CA (US); Joel Halpern, Leesburg, VA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 311 days.

(21) Appl. No.: 12/969,151

(22) Filed: Dec. 15, 2010

(65) Prior Publication Data
US 2012/0155442 A1   Jun. 21, 2012

(51) Int. Cl.
*H04W 40/36* (2009.01)
*H04W 36/00* (2009.01)
*H04W 60/00* (2009.01)

(52) U.S. Cl.
USPC .......... 370/338; 370/329; 370/400; 455/444; 455/432.1; 455/435.1; 709/228; 709/242

(58) Field of Classification Search
USPC ....... 370/328, 329, 331, 338, 400; 455/432.1, 455/436, 439, 435.1, 444; 709/228, 242
See application file for complete search history.

(56) References Cited

U.S. PATENT DOCUMENTS

| | | | | |
|---|---|---|---|---|
| 7,602,747 | B2 * | 10/2009 | Maksymczuk et al. | 370/331 |
| 8,068,840 | B2 * | 11/2011 | Patel et al. | 455/439 |
| 2007/0014262 | A1 * | 1/2007 | Gras et al. | 370/331 |
| 2009/0245149 | A1 | 10/2009 | Xia et al. | |
| 2010/0150107 | A1 * | 6/2010 | Aghvami et al. | 370/331 |
| 2010/0150108 | A1 * | 6/2010 | Aghvami et al. | 370/331 |
| 2010/0202385 | A1 * | 8/2010 | Hirano et al. | 370/329 |
| 2010/0296443 | A1 * | 11/2010 | Hirano et al. | 370/328 |
| 2011/0106959 | A1 * | 5/2011 | Suciu et al. | 709/230 |

OTHER PUBLICATIONS

Atkinson; ILNP Concept of Operations; Aug. 18, 2010; Internet Draft, draft-rja-ilnp-intro-06.txt; 35 pages.
Rosen, et al.; Multiprotocol Label Switching Architecture; Jan. 2001; Network Working Group; 61 pages.
Farinacci, et al.; Locator/ID Separation Protocol (LISP); Sep. 29, 2009; 73 pages.
Choi, Jun K., et al., "*Extension of LDP for Mobile IP Service through the MPLS Network* draft-Choi-mobileip-Idpext-03.txt; draft-Choi-mobileip-idpext-03.txt", 20011101, No. 3, Nov. 1, 2001, XP015000539.

(Continued)

*Primary Examiner* — Chi Pham
*Assistant Examiner* — Ahmed Elallam
(74) *Attorney, Agent, or Firm* — Blakely Sokoloff Taylor & Zafman, LLP

(57) ABSTRACT

A method performed by a network element for providing micro-mobility in a network to a mobile node including the steps of receiving a registration request message at the mobility anchor point from an access router that is currently coupled to the mobile node, wherein the registration request message includes an endpoint identifier of the mobile node and a local care-of address of the mobile node, establishing a label switch path (LSP) between the mobility anchor point and the access router, storing the endpoint identifier in a binding entry along with the local care-of address, a regional care-of address, the label switch path and an egress interface, advertising the endpoint identifier with associated regional or local care-of address of the mobile node, and forwarding data packets, received at the mobility anchor point from a corresponding node that have the regional or local care-of address, to the mobile node using the LSP.

12 Claims, 4 Drawing Sheets

OTHER PUBLICATIONS

Dong, Y. , et al., "*Scalable and QoS capable MPLS-based micromobility management,*" *Mobile Technology, Applications and Systems, 2005 2ND International Conf. On* Guangzhou, China, Nov. 15, 2005, XP031887387.

Soliman, et al., "*Hierarchical Mobile IPv6 (HMIPv6) Mobility Management*", Hierarchical Mobile IPV6 Mobility Management, RFC5380.TXT, Internet Engineering Task Force, IETF; Standard, *Internet Society*, 4, Rue Des Falaisis CH-1205, Oct. 1, 2008, XP015060354.

Taghizadeh, et al., "*MPLS Assisted Handover in IP-Based Mobility Management Schemes: A Survey*", *Computer Research and Development, 2010 Second International Conf on*, IEEE, Piscataway, NJ, USA, May 7, 2010, pp. 34-38, XP031692747.

\* cited by examiner

METHOD AND SYSTEM FOR EFFICIENT HOMELESS MPLS MICRO-MOBILITY

FIELD OF THE INVENTION

The embodiments of the invention relate to a method and system for enabling mobility within an MPLS domain for a mobile node without the use of a static home agent or the use of IP in IP tunneling.

BACKGROUND

The mobile Internet protocol version 6 (MIPv6) allows a mobile device to maintain a continuous connection with another device (referred to as a "corresponding node") that supports Internet protocol version 6. Two separate modes of communication are supported with MIPv6: bi-directional tunneling (BT) mode and route optimization (RO) mode. Mobile IPv6 utilizes a home agent node to manage the forwarding of data traffic to a mobile node when that mobile node is not present in a home network.

When a mobile node moves to a foreign network, the mobile node registers in that network and reports the registration back to the home agent node. The home agent node receives data traffic from the corresponding node and forwards the traffic to the mobile node in the foreign network using IP in IP tunneling in BT mode. In RO mode the home agent facilitates the communication between the corresponding node and the mobile node such that the corresponding node is notified of the new location and the address of the mobile node in the foreign network allowing the corresponding node to directly communicate with the mobile node in the foreign network without interruption to the transmission control protocol (TCP) connection between the mobile node and the corresponding node.

Variations of mobile IPv6 enable mobility within particular domains which is referred to as local or micro mobility and mobility between domains is referred to as global mobility. Some of these variations of the mobile IPv6 standard include fast MIP (FMIP), hierarchical MIP (HMIP) and regional MIP (RMIP). Each of these technologies include significant overhead in signaling that diminishes their efficiency.

SUMMARY

A method performed by a network element for providing micro-mobility in a network to a mobile node, wherein micro-mobility is maintenance of a communication session between the mobile node and a corresponding node while changing connections between different ones of a plurality of access routers within the network, wherein the network element functions as a mobility anchor point, the mobility anchor point in communication with the plurality of access routers within the network, the method comprising the steps of: receiving a registration request message at the mobility anchor point from an access router in the plurality of access routers, wherein the access router is currently coupled to the mobile node, and wherein the registration request message includes an endpoint identifier of the mobile node and a local care-of address of the mobile node; establishing a label switch path (LSP) between the mobility anchor point and the access router to handle data packets received at the mobility anchor point destined for the mobile node; storing the endpoint identifier of the mobile node in a binding entry in a bindings cache along with the local care-of address of the mobile node, a regional care-of address of the mobile node, the label switch path and an egress interface of the mobility anchor point; advertising over the network one or more of the endpoint identifier with associated regional or local care-of address of the mobile node by the mobility anchor point or access router; and forwarding data packets, received at the mobility anchor point from a corresponding node that have the regional or local care-of address, to the mobile node using the LSP, whereby micro-mobility is provided within the network to the mobile node with reduced signaling and tunneling overhead than using a static home agent node and Internet Protocol in Internet Protocol tunneling between the static home agent and the mobile node.

A network element configured to provide micro-mobility in a network to a mobile node, wherein micro-mobility is maintenance of a communication session between the mobile node and a corresponding node while changing connections between different ones of a plurality of access routers within the network, the network element to be coupled in communication with the plurality of access routers within the network, the network element to act as a mobility anchor point for the network, the system comprising: an ingress module to receive data packets over a network connection; an egress module to transmit data packets over the network connection; and a network processor communicatively coupled to the ingress module and egress module, the network processor configured to execute a binding cache management module, a multi-protocol label switching module and a network mobility management module, the binding cache management module configured to store a binding entry correlating a regional care-of address of the mobile node, an endpoint identifier of the mobile node, a label switch path (LSP) between an access router currently coupled to the mobile node and the network element, and a local care-of address for the mobile node, the multiprotocol label switch (MPLS) management module configured to establish the LSP in response to a registration request message from the access router, and a network mobility management module configured to receive the registration request message from the access router and create a binding entry for the mobile node, the network mobility management module to forward data traffic addressed to the regional care-of address of the mobile node to the access router over the LSP and to selectively advertise the endpoint identifier of the mobile node and the associated regional care-of address of the mobile node outside the network or the associated local care-of address within the network, whereby micro-mobility is provided within the network to the mobile node with reduced signaling and tunneling overhead than using a static home agent node and Internet Protocol in Internet Protocol tunneling between the static home agent and the mobile node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
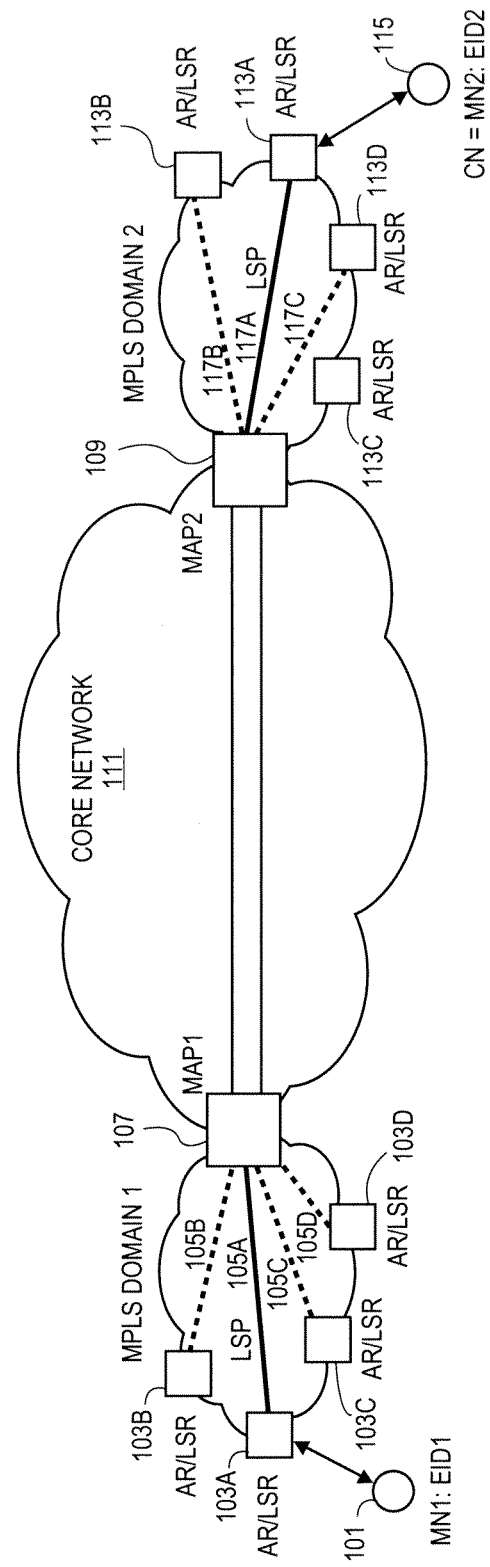
FIG. 1 is a diagram of one embodiment of a network implementing the homeless micro-mobility system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operation of the flow diagram will be described with reference to the exemplary embodiments of FIGS. 1-3. However, it should be understood that the operations of the flow diagram can be performed by embodiments of the invention other than those discussed with reference to FIGS. 1-3, and the embodiments discussed with reference to FIGS. 1-3 can perform operations different than those discussed with reference to the flow diagram of FIG. 4.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including a requirement that an end host (i.e., the mobile node) be modified, a requirement that a significant amount of mobility signaling and messages be utilized or that significant signaling overhead is required, a requirement that a static home agent node is utilized and the requirement that significant overhead is utilized for Internet protocol (IP) tunneling and corresponding overhead for the security of the IP tunneling. Other disadvantages in the prior art include a lack of support for traffic engineering capabilities.

The embodiments of the invention overcome the disadvantages of the prior art by providing a network-based micro-mobility protocol which uses Multi-Protocol Label Switching (MPLS) for both signaling and data packets routing. By implementing an identifier/locator split at the end host side, a bidirectional Label Switch Path (LSP) established between the mobility anchor point (MAP) and the mobile node's access router (AR) can be tied to the corresponding mobile node (CN) by binding the LSP to the mobile node's (MN's) static and unique identifier. An MPLS mobility proxy feature is also implemented on the access router side, which takes care-of registering the mobile node at the mobility anchor point and possibly associating with it an internal locator (i.e., the one configured on the access route), in addition to the one associated with the mobility anchor point.

By implementing an identity/location split at the end host side, the need for a static home agent (HA), which has been a main requirement in most IP-based mobility solutions, is removed thereby allowing the mobile node a higher degree of flexibility in terms of avoiding the need for a dedicated or static home agent. Such a split enables the mobile node to choose one (or multiple) identifier(s) and to maintain these identifiers while moving within a particular domain or roaming across multiple domains. In such a scenario, a locator value is maintained and tracked by the mobile nodes current access router and by the domain's associated mobility anchor point. The mobile node is unaware of its mobility simply because the location value is removed and delegated entirely to the infrastructure. This process removes the need to focus on enabling mobility at the IP layer and allows the use of a more efficient and features-oriented switching protocol operating below the IP layer.

In the infrastructure of a particular domain, the MPLS protocol is used because it enables dynamic set up of dedicated bidirectional LSPs between the mobility anchor point and the access router of the mobile nodes which incorporate Traffic Engineering (TE) capabilities. LSPs can be created on-demand and per mobile node in response to a request sent by the current access router of the mobile node to the mobility anchor point, which establishes an upstream LSP. Following a request from the access router, the mobility anchor point establishes the downstream LSP, binds an associated label to the mobile node's identity, and stores the parameters in its binding entries table (along with other parameters such as binding lifetime, TE, etc.) In addition, the mobile node's access router associates the mobility anchor point location to the mobile node to make it reachable from outside (e.g., via domain name system (DNS)) and potentially its own location to make it reachable from inside the domain (i.e., without the need to route packets via the mobility anchor point). Fast mobility is also enabled by allowing the mobility anchor point to establish additional LSPs with other access routes adjacent to the mobile node's current access router in which case, switching data traffic to the new LSP won't require extra AR-to-MAP signaling and will provide reduced latency during the handoff to establish the upstream and downstream LSPs between a new access router and the mobility anchor point.

The mobility anchor point and access router take care of associating locator(s) with the mobile node and advertising it. These locators routing within and between domains becomes completely independent (and separated) from the mobile node. As a result, the mobile node can focus only on its own identifier and on the destination's identifier fully qualified domain name (FQDNs) while delegating the destination location lookup tasks to the mobility anchor point and access router nodes. In this system, the mobility anchor point to establish modify becomes a temporary home agent for the mobile node.

This method and system are well suited for dual mobility whereby the corresponding node is also a mobile node moving within its own domain (i.e., using a different mobility anchor point), as they limit potential signaling exchange between the domains' corresponding mobility anchor point. For example, the system and method allows the destination mobility anchor point to establish modify LSPs with the same traffic engineers parameters as the ones used between the mobility anchor and the mobile node, prior to tunneling data packets to the destination node.

In one embodiment, to enable data packet routing across domains, the method and system can be extended to benefit from the identifier/locator split concept applied to the infrastructure side (e.g., as suggested by the Locator/ID Separation Protocol (LISP)). LISP consists of tunneling data packets between two main nodes (i.e., an Ingress Tunneling Router (ITR) and Egress Tunneling Router (ETR)) while using the configured endpoint IP address for local routing (e.g., between the access and the edge). For this purpose, the mobility anchor point node can have ITR and/or ETR functionalities. One skilled in the art would understand that using an MPLS between a mobile node and a mobility anchor point is not a requirement. Other similar technologies can be utilized to provide the intra-domain mobility for both the initiator and the destination devices.

The advantages provided by this method and system include the avoidance of modification to end nodes such as the mobile node and the corresponding node, avoiding the need for mobility signaling at the mobile node, a combination of mobility and traffic engineering signaling which minimizes the hand off latency and setup for dedicated paths between the mobility anchor point and the mobile nodes access router. Other advantages include the ability to set up dedicated paths between the mobility anchor point and the corresponding node prior to tunneling data packets between them. The method and system optimizes bandwidth usage and support wireless links, because there is no IP tunneling and the solution is fast, scalable, secure and suitable for mobile endpoints at each end of the communication session.

FIG. 1 is a diagram of one embodiment of a network implementing the homeless micro-mobility system. The architecture of FIG. 1 represents a simplified example where a single mobile node 101 is communicating with a corresponding node 115. The mobile node 101 is communicating through an access router (AR)/label switch router (LSR) 103A and a mobility anchor point 107 in its local domain. The mobility anchor point 107 forwards data from the mobile node 101 over the network 111 to the mobility anchor point 109 of the destination domain, which in turn forwards the data to the access router/label switch router 113A connected to the corresponding node 115. In other embodiments, any number of mobile nodes can be supported in the domain. The domain can include any number of intermediate machines between the access routers 103A-103D and the mobility anchor point 107. Any number of devices can also be present between the mobility anchor points 107, 109 in the core network 111. In the provided example, both domains provide multi-protocol label switch based homeless micro-mobility where each of the access routers in a domain has the capability of functioning as a label switch router. The mobile node 101 and the corresponding node 115 are each assigned a static identifier referred to herein as an endpoint identifier (EID) which are unique within their respective domains. Upon attachment to a domain, the mobile nodes 101, 115 announce their EIDs to their respective access routers. EIDs are unique within a domain and there is a 1:1 mapping between an EID and an LSP at a particular access router. The EID can have any format or size that is sufficient to uniquely identify a node in a domain.

The mobile node 101 can be any type of computing device including a desk top computer, lap top computer, a hand held device, a console device or similar computing device. The mobile node 101 can be connected to an access router 103A through any type of communication medium including a wired or wireless communication medium.

The access routers 103A-103B can be any type of access device including a wired communication hub, a wireless router or similar networking device. Any number of access routers 103A-103D can be present in a domain. These access routers 103A-103D support multi-protocol label switching (MPLS) and function as label switch routers. The access routers 103A-103D are in communication with the mobility anchor point 107 through any number of intermediate machines and through any communication medium such as a wired or wireless communication network within the domain.

The mobility anchor point 107 is any type of networking element such as a network router or similar device that is capable of implementing the multi-protocol label switching standard as well as capable of implementing the homeless micro-mobility networking functionality described herein. The mobility anchor point 107 can be in communication with other mobility anchor points, such as mobility anchor point 109, in other domains over a core network 111. The core network 111 can be any type of network including a local area network (LAN) or wide area network (WAN) such as the Internet, or similar network. The core network 111 can include any number of intermediary machines between the mobility anchor point 107 and the mobility anchor point 109.

The corresponding node 115 can also be a mobile node connected to an access router 113A. The properties of the access routers 113A-113D and the secondary domain can be similar to or different from those of the first domain. Each of the access routers 113A-113D can be any type of computing device or networking device capable of providing access through the domain network to the corresponding node 115. The corresponding node 115 can communicate with these access routers 113A-113D through a wired or wireless connection. Similarly, the access routers 113A-113D communicate with the mobility anchor point 109 through any number of intermediary computing devices in the secondary domain using both wired and wireless connections. In other embodiments, the corresponding node 115 is not a mobile device and has a fixed location in the destination domain.

In one embodiment, the access routers 103A-103D and 113A-113D can communicate with their respective mobility anchor points 107 and 109 through a set of label switch paths 105A-105D and 117A-117D. Similarly, end to end communications can be provided from the mobile node 101 to corresponding node 115 by a combination of the label switch paths 105A-105D, a connection between the mobility anchor point 107 and 109 and the label switch paths 117A-117D. In one embodiment, the mobility anchor points 107 and 109 can communicate with each other through a tunnel over the core network 111 or through a similar connection.

Figure 2:
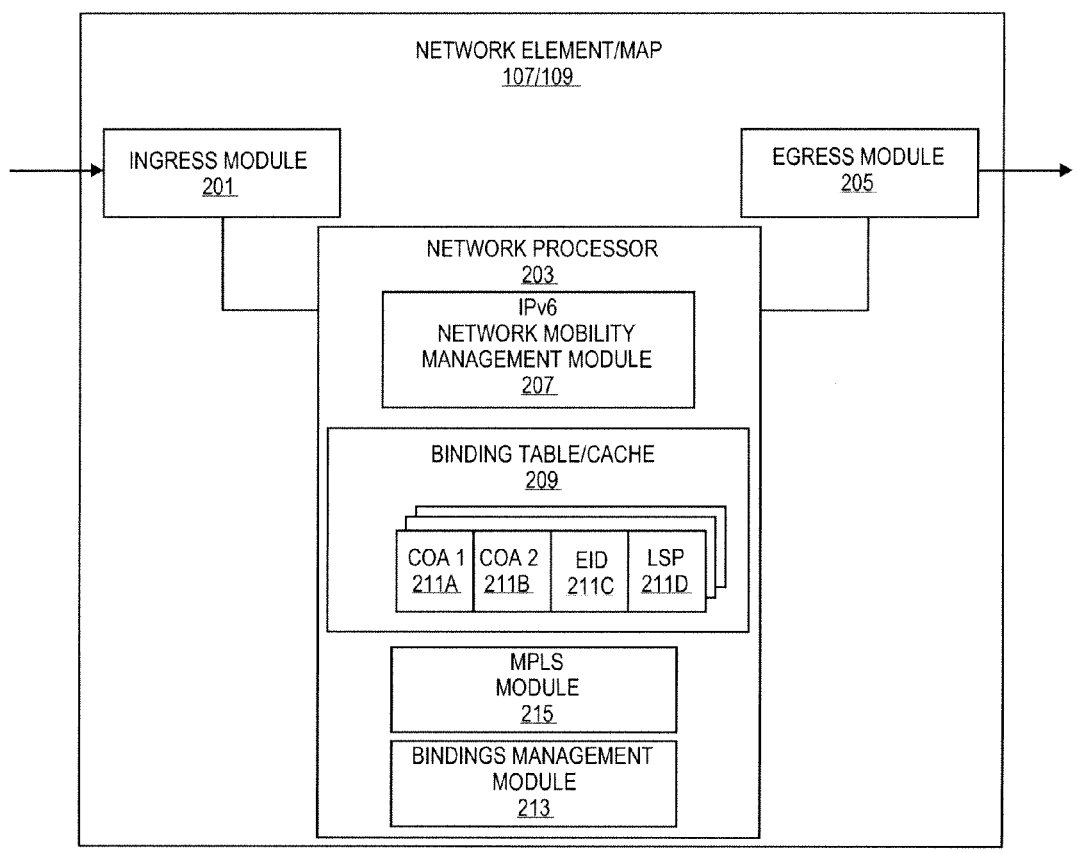
FIG. 2 is a diagram of one embodiment of a network element implementing the mobile access point.

FIG. 2 is a diagram of one embodiment of a mobility anchor point 107,109. The mobility anchor point 107,109 can include an ingress module 201, an egress module 205 and a network processor 203. The ingress module 201 can handle the processing of data packets being received by the mobility anchor point 107,109 at the physical link and data link level. The egress module 205 handles the processing of data packets being transmitted by the network element at the physical link and data link level. The network processor 203 handles the routing, forwarding and higher level processing of the data traffic. The processor 203 can execute or include an IPv6 network mobility management module 207, translation binding table or cache 209, translation bindings management module 213 and a MPLS module 215. The network processor 203 can be a general purpose processor such as a central processing unit or a specialized network processor. One of ordinary skill in the art would understand that the mobility anchor point 107,109 can be any type of computing device and would include memory devices, persistent storage, buses and similar standard computer architecture. These elements have been omitted for sake of clarity.

The network mobility management module 207 manages ingress and egress traffic at the higher levels including the Internet Protocol level. The network mobility management module facilitates the forwarding of traffic toward its destination within the mobility anchor point 107, 109 and external to the mobility anchor point 107,109. The network mobility management module 207 handles incoming registration requests from mobile nodes, coordinates location lookup for data traffic received from mobile nodes and provides similar services. The registration and data forwarding services that enable mobility for mobile nodes in the network are discussed in further detail in regard to FIG. 4. These functions are implemented by the network mobility management module 207. The network mobility management module 207 also interfaces with the MPLS module 215 to establish LSPs for each registered mobile node. The network mobility management module 207 can also coordinate with the MPLS module 215 to forward data packets through established LSPs. The network mobility management module 207 interfaces with the bindings management module 213 to maintain the binding table or cache 209 which stores an entry for each registered mobile node that induces its regional care-of address 211A, local care-of address 211B its endpoint identifier 211C and LSP label 211D that has been set up in the domain including an indication of an active LSP.

Figure 3:
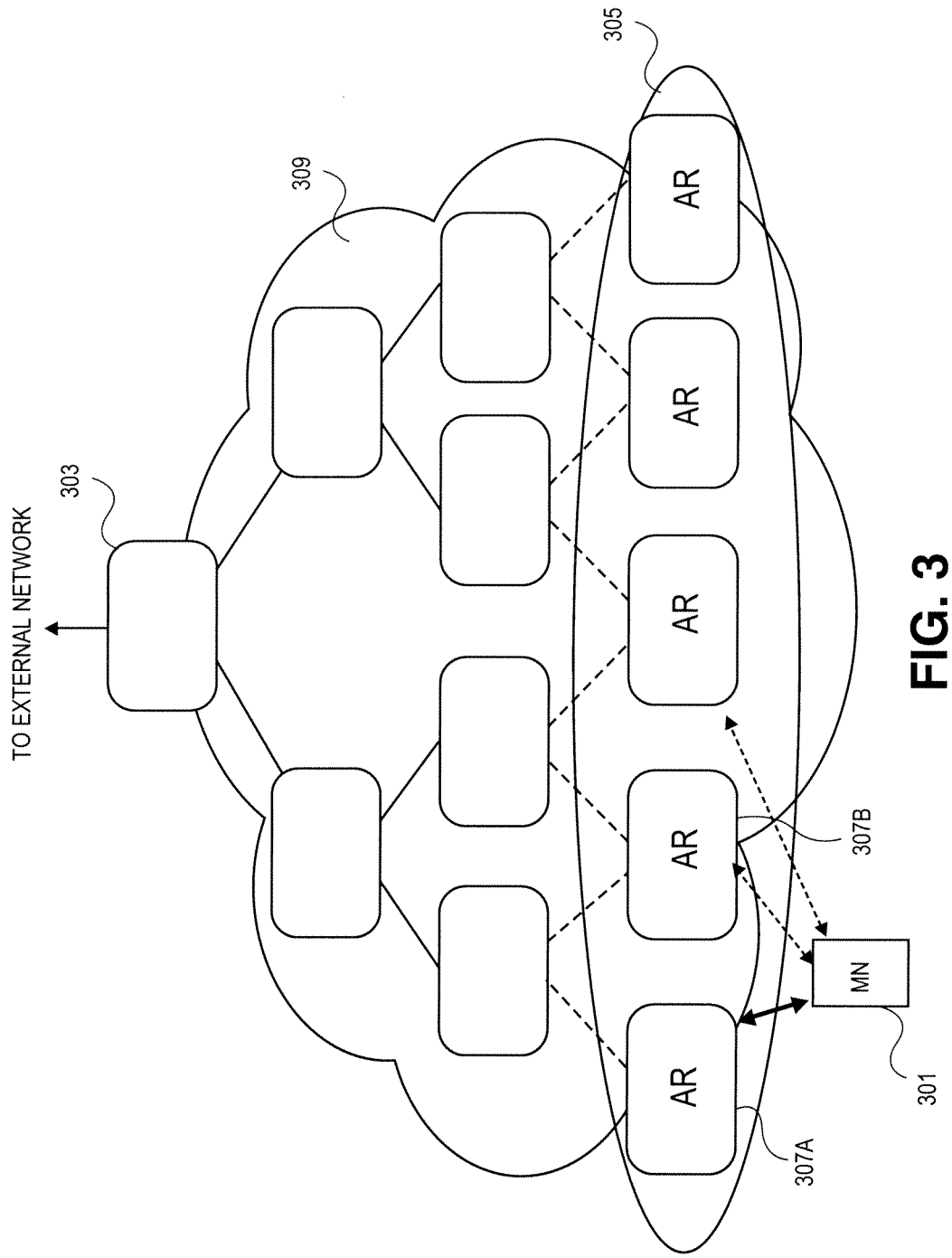
FIG. 3 is a diagram of one example of a micro-mobility topology within a domain.

FIG. 3 is a diagram of one example of a micro-mobility topology within a domain. In one embodiment, the local domain may have a hierarchal structure as illustrated in FIG. 3. The micro-mobility topology within the domain can be a hierarchal MIPv6 structure or similar structure. The mobility anchor point 303 can be the node which provides communication with external networks. Within this domain hierarchy a mobile node 301 can connect with any of the access routers 305. The mobile node 301 can be connected to one or more of the access routers 305 at any given time. For example, the mobile node 301 can connect to the access router 307A and subsequently connect to access router 307B with or without disconnecting from access router 307A.

Within the domain, the mobile nodes 301 can have two IPv6 addresses. The mobile node 301 can have a local care-of address which is configured with a prefix advertised by the connected access router 307A. The second address is a regional care-of address which can be advertised with a prefix advertised by the mobility anchor point 303. The local care-of address is registered with the mobility anchor point 303, which tracks the correlation between the local care-of address, the regional care-of address, the endpoint identifier and the mobile node specifying LSPs.

Traffic destined for the mobile node received from an external network would utilize the regional care-of address. The mobility anchor point 303 will then translate this traffic to utilize the local care-of address which enables routing through the domain. In addition, the mobility anchor point 303 establishes label switch paths and determines the appropriate label for forwarding traffic to the access router 307A to which the mobility node 301 is connected. In one embodiment, the mobility anchor point 303 will have established specific label switch paths to each of the access routers 307A, B in the domain that are specific to the mobile node 301 such that the mobile node can connect to any of the access routers and maintain connectivity with minimal latency and signaling overhead since the label switch path for all or adjacent access routers are established at the time the mobile node first registers with the mobility anchor point 305.

Figure 4:
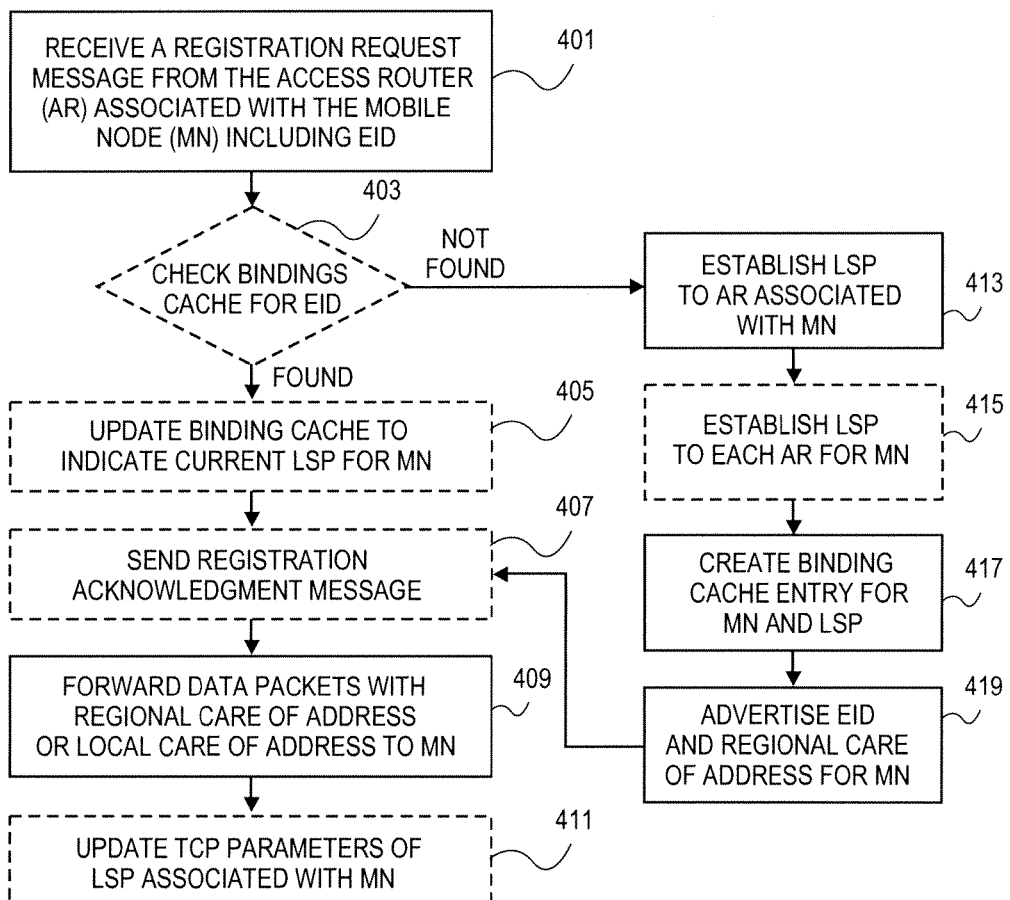
FIG. 4 is a flowchart of one embodiment of the mobility access point functionality.

FIG. 4 is a flowchart of one embodiment of the mobility anchor point functionality. A process can be initiated by the connection of the mobile node to the network or an access router in the network. Upon connection to the access router, the access router sends a registration request message to the mobility anchor point, which includes the local care-of address and the endpoint identifier for the mobile node (Block 401). Upon receipt of the registration request, the mobility anchor point may check its bindings table to determine whether there is already an entry for the received endpoint identifier (Block 403). If the check determines there is no corresponding endpoint identifier in the bindings table, then the mobility anchor point can start the process of establishing a label switch path to the access router associated with the registering mobility node (Block 413). This LSP will be specific to the mobility node and there will be a one to one correspondence between the EID and the LSP. In some embodiments, the mobility anchor point may then establish LSPs to each of the access routers in the domain or adjacent access points where each LSP will be specific to the mobility node (Block 415).

A bindings table entry is created for the mobility node that will include its local care-of address, its regional care-of address, its LSP label and its endpoint identifier (Block 417). In one embodiment, a single bindings table entry is created per endpoint identifier or mobile node. In other embodiments, a separate bindings table entry is created for each LSP associated with an endpoint identifier. The mobile anchor point can then advertise the regional care-of address and/or EID for the mobility node (Block 419). This advertisement can take the form of providing the regional care-of address and/or EID to the DNS of the domain as well as other DNS servers. This enables nodes external to the network to determine the address and/or location of the mobile node. In some embodiments, the local care-of address can also be advertised within the network.

The mobility anchor point can then send a registration acknowledgement messaging to the access router tied to the mobile node (Block 407). The access router then can utilize the established LSP to forward traffic to the mobility anchor point associated with that EID and mobile node. When data packets are received at the mobility anchor point having the regional care-of address or local care-of address, they are then forwarded to the access router associated with mobile node to ultimately be provided to the mobile node (Block 409). The mobility anchor point can translate the data packets to utilize a local care-of addresses in place of the regional care-of address. In some scenarios the mobility anchor point can then receive data traffic from the mobility node or from the corresponding node that includes parameters to establish specific traffic engineering conditions such as specific levels of quality of service. The mobility anchor point will then update the parameters of the LSP associated with mobility node to match the parameters received in the data packets at the mobility anchor point (Block 411).

Similarly, when a mobile node has outgoing traffic it is sent to the mobility anchor point via the established LSP. The mobility anchor point looks up the location of the destination address of the corresponding node. Referring to the example of FIG. 1, such a location would be the address of the mobility anchor point of the domain in which the corresponding node resides. After obtaining the address of the mobility anchor point of that domain, the mobility anchor point in the mobile nodes domain tunnels the packets to the mobility anchor point of the corresponding nodes domain. This look up exchange may also include traffic engineering parameters associated with the LSP created by the first mobility anchor point of the mobile node and are to establish and modify the LSP between the mobility anchor point in the corresponding node and the destination domain.

Any time that a mobile node switches between access routers within respective domain, the EID remains the same while the newly associated access router updates the corresponding mobility anchor point about the new mobile node's location by initiating this process of sending in a registration request and receiving a registration acknowledgment.

In this case, when the mobility anchor point checks the bindings table it will find an existing EID. In this case, the found binding table entry is updated to indicate the current LSP and access router for the mobility node (Block 405). The process then continues by then sending the registration acknowledged message to the new access router (Block 407). The mobility anchor point then begins the forwarding of data packets received that having the regional care-of address to the mobility node at the new location (Block 409). Similarly, the traffic engineering and parameters of this LSP can be updated by the mobility anchor point or specified in the data traffic.

Thus, a method, system and apparatus for enabling homeless MPLS based communication has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed by a network element for providing micro-mobility in a network to a mobile node, wherein micro-mobility is maintenance of a communication session between the mobile node and a corresponding node while changing connections between different ones of a plurality of access routers within the network, wherein the network element functions as a mobility anchor point, the mobility anchor point in communication with the plurality of access routers within the network, the method comprising the steps of:

receiving a registration request message at the mobility anchor point from an access router in the plurality of access routers, wherein the access router is currently coupled to the mobile node, and wherein the registration request message includes an endpoint identifier of the mobile node and a local care-of address of the mobile node;

establishing a label switch path (LSP) between the mobility anchor point and the access router to handle data packets received at the mobility anchor point destined for the mobile node;

storing the endpoint identifier of the mobile node in a binding entry in a bindings cache along with the local care-of address of the mobile node, a regional care-of address of the mobile node, the label switch path and an egress interface of the mobility anchor point;

advertising over the network one or more of the endpoint identifier with associated regional or local care-of address of the mobile node by the mobility anchor point or access router; and forwarding data packets, received at the mobility anchor point from a corresponding node that have the regional or local care-of address, to the mobile node using the LSP, whereby micro-mobility is provided within the network to the mobile node with reduced signaling and tunneling overhead than using a static home agent node and Internet Protocol in Internet Protocol tunneling between the static home agent and the mobile node.

2. The method of claim 1, further comprising the steps of:
establishing separate label switch paths to each access router in the plurality of access routers in response to receiving the registration request message.

3. The method of claim 1, further comprising the steps of:
receiving another registration request message at the mobility anchor point from a second access router of the access routers, the second access router being currently coupled to the mobile node; and
updating the binding entry of the endpoint identifier to include a label of an LSP between the mobility anchor point and the second access router.

4. The method of claim 1, further comprising the steps of:
receiving a data packet destined for the mobile node specifying traffic engineering parameters; and
modifying a traffic engineering parameter of the LSP between the mobility anchor point and the access router based on the received traffic engineering parameters.

5. The method of claim 1, further comprising the steps of:
sending a registration acknowledgement message to the access router.

6. The method of claim 1, further comprising the steps of:
receiving a data packet at the mobility anchor point from the mobile node over the LSP; and
forwarding the data packet to the corresponding node.

7. A network element configured to provide micro-mobility in a network to a mobile node, wherein micro-mobility is maintenance of a communication session between the mobile node and a corresponding node while changing connections between different ones of a plurality of access routers within the network, the network element to be coupled in communication with the plurality of access routers within the network, the network element to act as a mobility anchor point for the network, the network element comprising:
- an ingress module to receive data packets over a network connection;
- an egress module to transmit data packets over the network connection; and
- a network processor communicatively coupled to the ingress module and egress module, the network processor configured to execute a binding cache management module, a multi-protocol label switching module and a network mobility management module,
- the binding cache management module configured to store a binding entry correlating a regional care-of address of the mobile node, an endpoint identifier of the mobile node, a label switch path (LSP) between an access router currently coupled to the mobile node and the network element, and a local care-of address for the mobile node,
- the multiprotocol label switch (MPLS) management module configured to establish the LSP in response to a registration request message from the access router, and
- a network mobility management module configured to receive the registration request message from the access router and create a binding entry for the mobile node, the network mobility management module to forward data traffic addressed to the regional care-of address of the mobile node to the access router over the LSP and to selectively advertise the endpoint identifier of the mobile node and the associated regional care-of address of the mobile node outside the network or the associated local care-of address within the network, whereby micro-mobility is provided within the network to the mobile node with reduced signaling and tunneling overhead than using a static home agent node and Internet Protocol in Internet Protocol tunneling between the static home agent and the mobile node.

8. The network element of claim 7, wherein the network mobility management module is configured to send a registration acknowledgment message to the access router.

9. The network element of claim 7, wherein the network mobility management module is configured to establish separate label switched paths for the mobile node through the MPLS module between the network element and each access router in the network in response to the registration request message.

10. The network element of claim 7, wherein the network mobility management module is configured to receive another registration request message from a second access router currently coupled to the mobile node, and is configured to update the binding entry with the endpoint identifier of the mobile node to include a label of an LSP for the second access router.

11. The network element of claim 7, wherein the network mobility management module is configured to receive a data packet from the mobile node and forward the data packet to a corresponding node.

12. The network element of claim 7, wherein the MPLS module is configured to receive a data packet from the mobile node specifying traffic engineering parameters and is configured to modify the traffic engineering parameter of the LSP between the mobility anchor point and the access router.

* * * * *

UNITED STATES PATENT AND TRADEMARK OFFICE
CERTIFICATE OF CORRECTION

PATENT NO. : 8,503,416 B2
APPLICATION NO. : 12/969151
DATED : August 6, 2013
INVENTOR(S) : Haddad et al.

Page 1 of 1

It is certified that error appears in the above-identified patent and that said Letters Patent is hereby corrected as shown below:

In the Specification

In Column 8, Line 36, delete "point 305." and insert -- point 303. --, therefor.

Signed and Sealed this
Thirty-first Day of December, 2013

Margaret A. Focarino
*Commissioner for Patents of the United States Patent and Trademark Office*